(12) United States Patent
Osada

(10) Patent No.: US 7,387,326 B2
(45) Date of Patent: Jun. 17, 2008

(54) INTERIOR TRIM FOR AUTOMOBILE

(75) Inventor: Hiroshi Osada, Fujisawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/730,331

(22) Filed: Mar. 30, 2007

(65) Prior Publication Data
US 2007/0236032 A1 Oct. 11, 2007

(30) Foreign Application Priority Data
Apr. 11, 2006 (JP) ............................. 2006-108516

(51) Int. Cl.
B60R 13/01 (2006.01)
(52) U.S. Cl. .................. 296/39.1; 296/153; 296/1.09
(58) Field of Classification Search ................ 296/153, 296/39.1, 1.09
See application file for complete search history.

(56) References Cited

U.S. PATENT DOCUMENTS 3,362,749 A * 1/1968 Clement ................ 297/411.21
6,248,205 B1 * 6/2001 Scheidmantel et al. .. 156/309.6
2005/0194806 A1 * 9/2005 Cowelchuk et al. ....... 296/1.09
2005/0242619 A1 11/2005 Schoemann et al.

FOREIGN PATENT DOCUMENTS

| DE | 41 40 706 A1 | 6/1993 |
|---|---|---|
| DE | 102 60 396 B3 | 6/2004 |
| DE | 103 14 603 B3 | 8/2004 |
| GB | 2 272 670 A | 5/1994 |
| JP | 2005-067526 | 3/2005 |

* cited by examiner

Primary Examiner—Joseph D Pape
(74) Attorney, Agent, or Firm—Foley & Lardner LLP

(57) ABSTRACT

Provided is an interior trim for an automobile which facilitates adjustment of an anisotropic structure of an armrest. The interior trim for an automobile is provided with an armrest projecting from a trim body which supports the armrest on a surface side of the trim body disposed on a cabin side of a car body. The armrest includes a core member, and multiple pad layers stacked on the core member, and boundary surfaces of the pad layers are made separable by external force applied from a side.

14 Claims, 5 Drawing Sheets

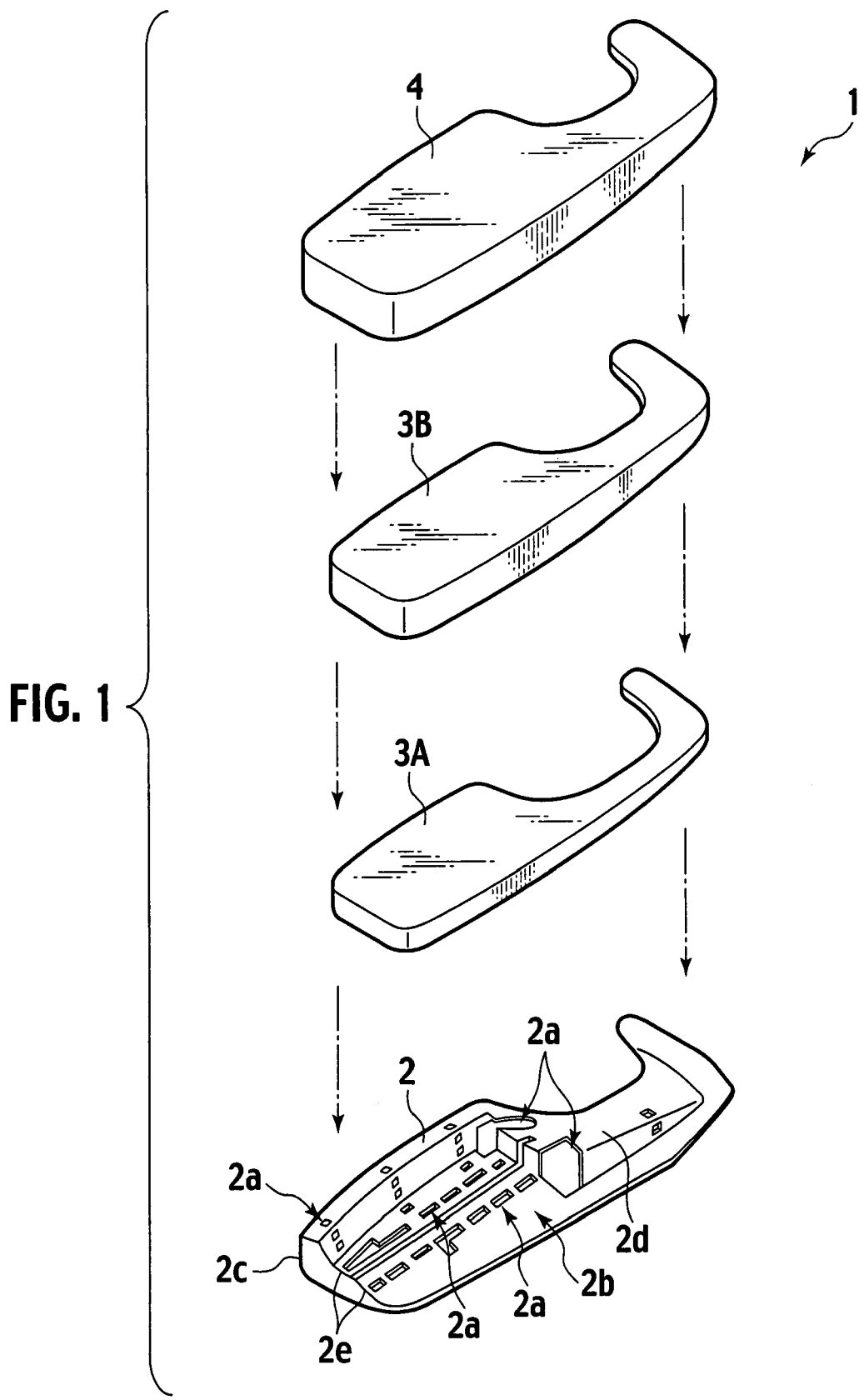

INTERIOR TRIM FOR AUTOMOBILE

CROSS-REFERENCE TO RELATED APPLICATION

This application is based on and incorporates herein by reference Japanese Application No. 2006-108516 filed on Apr. 11, 2006 with the Japan Patent Office.

BACKGROUND OF THE INVENTION

1. Technical Field of the Invention

The present invention relates to an interior trim for an automobile which is disposed on a cabin side of a car body, with an armrest provided as projecting from the interior trim.

2. Description of the Related Art

Conventionally, interior trims including a door trim, a rear side trim, a luggage side trim and the like, are provided on a cabin side of a car body panel of an automobile. These trim bodies are sometimes provided with projecting armrests which can support elbows of passengers. (Refer to Japanese Application Publication No. 2005-67526A)

Such an armrest is designed to have sufficient rigidity against downward load applied with an elbow of a passenger, and also to have deformability or fragility upon load applied from a side.

However, the structure configured to be deformable or fragile against load applied from a side while maintaining rigidity against the downward load, is equivalent to an anisotropic structure configured to exhibit incompatible characteristics depending on the direction of load application. Accordingly, it is difficult to adjust the structure properly to obtain an optimal structure.

SUMMARY OF THE INVENTION

An object of the present invention is to provide an interior trim for an automobile, which can facilitate adjustment of an anisotropic structure of an armrest.

To attain the object, the present invention provides an interior trim for an automobile provided with an armrest projecting from a trim body which supports the armrest, on a surface side of the trim body disposed on a cabin side of a car body. Here, the armrest includes a core member, and multiple pad layers stacked on the core member. At least one interface between the pad layers are made separable in response to external force applied from a side.

BRIEF DESCRIPTION OF THE DRAWINGS

FIG. 1 is an exploded perspective view of a configuration of an armrest provided as projecting from an interior trim for an automobile according to an embodiment of the present invention.

FIG. 4A shows a case where the pad layers are integrated with each other by use of an adhesive layer, and FIG. 4B shows a case where the two pads are made separable.

DETAILED DESCRIPTION OF THE PREFERRED EMBODIMENT

A preferred embodiment of the present invention will now be described below with reference to the accompanying drawings.

Figure 2A:
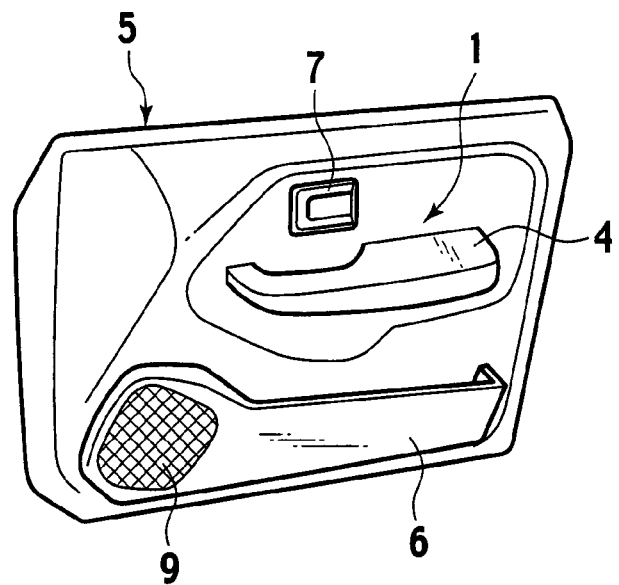
FIGS. 2A and 2B are perspective views of a trim body viewed from the inside of a cabin.
Figure 2B:
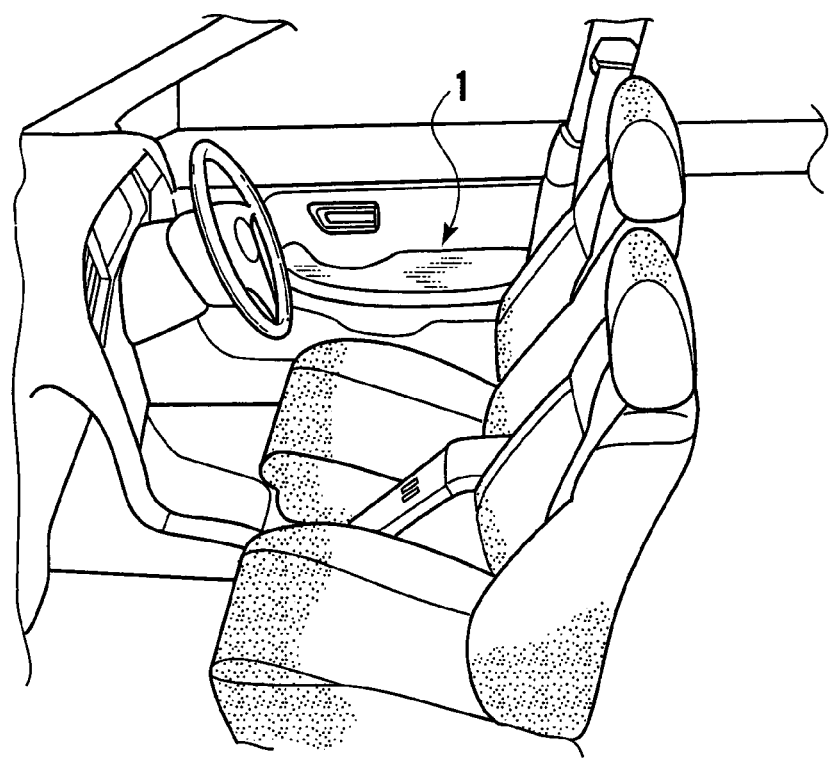

As shown in FIG. 2A, an interior trim for an automobile of this embodiment is a resin trim body 5 as a door trim to be disposed on a cabin side of a metallic door body (not shown) for an automobile.

This trim body 5 includes an armrest 1 provided as projecting to the cabin side, a pocket unit 6 provided as extending below the armrest 1 along a longitudinal direction of a car body, a handle unit 7 provided above the armrest 1, and engaged with the door body, and a speaker 9 embedded at a front part of the pocket unit 6.

As show in FIG. 1, this armrest 1 mainly includes a core member 2 fixed to the trim body 5, a lower pad layer 3A and an upper pad layer 3B which are stacked on the core member 2, and a skin unit 4 for covering surfaces of the armrest 1.

This core member 2 is a saucer-like member formed by molding rigid synthetic resin. A portion of the core member 2 for receiving an elbow of a passenger is formed into a most-recessed container portion 2b. In addition, a rib 2c and a deck portion 2b are formed around the container portion 2b.

Figure 3:
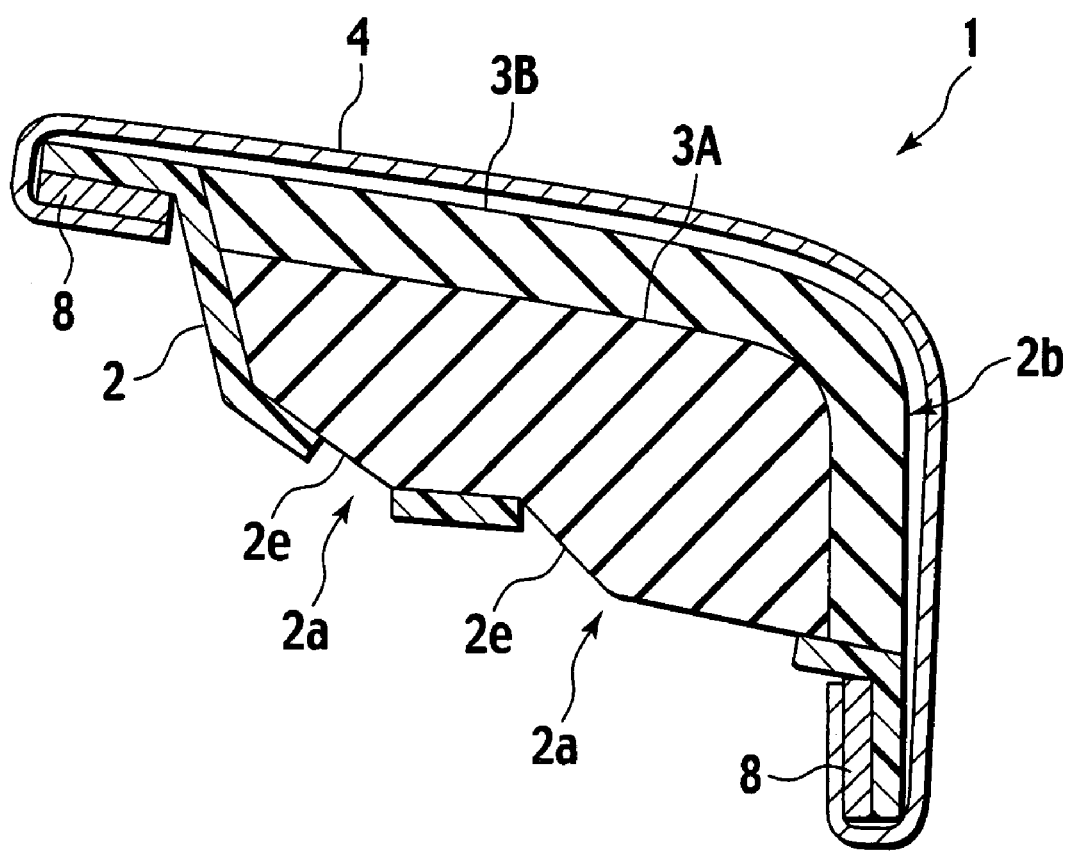
FIG. 3 is a cross-sectional view for explaining the configuration of the armrest.

Moreover, as shown in FIGS. 1 and 3, this container portion 2b is provided with multiple steps 2e, and multiple holes 2a arranged in the longitudinal direction of the car body with spaces interposed in between in a car width direction.

These holes 2a are provided to help deformation or breakage of the structure when load in the car width direction is applied to the core member 2. The holes 2a are formed not only on the container portion 2b but also on the rib 2c and on the deck portion 2d.

By providing the steps 2e, it is possible to increase energy absorption strokes when external force is applied from a side, and to achieve a deformable or fragile structure.

The pad layers 3A and 3B having substantially the same planar shape as the core member 2, are stacked on this core member 2.

As shown in FIG. 3, the lower pad layer 3A abutting on an upper surface of this core member 2 is a cushioning material made of polyurethane foam or rubber. A portion of the lower pad layer 3A to be contained in the container portion 2b is made thick.

The polyurethane foam is broadly categorized into three types of materials, namely, flexible urethane foam, semi-rigid urethane foam, and rigid urethane foam. Moreover, each of these categories includes materials in a variety of hardness obtained by changing compositions or foam rates of the materials. Accordingly, the lower pad layer 3A may be molded with an appropriate material selected from these materials.

For example, since the lower pad layer 3A is disposed on the upper surface of the core member 2 provided with irregular portion, it is appropriate to use flexible urethane foam which is soft and excellent in the deformation-following characteristic.

The upper pad layer 3B is disposed on the lower pad layer 3A. As shown in FIG. 3, the upper pad layer 3B has a substantially L-shaped cross section so as to cover the upper surface and a side surface of the lower pad layer 3A on the cabin side. This upper pad layer 3B can be molded with a material harder than the lower pad layer 3A, such as semi-rigid urethane foam.

Boundary surfaces of the lower pad layer 3A and the upper pad layer 3B are not bonded together with an adhesive. In other words, the lower pad layer 3A and the upper pad layer 3B simply overlap and abut on each other.

The skin unit 4 configured to cover the outside of this upper pad 3A and to form an upper surface and a side surface of this armrest 1 on the cabin side is made of a material such as polyvinyl chloride, leather or a fabric. As shown in FIG. 3, ends of the skin unit 4 are fixed to the core member 2 with adhesive portions 8.

Next, descriptions will be provided for an action of the armrest 1 of the interior trim for an automobile of this embodiment.

In the armrest 1 of this embodiment configured as described above, the boundary surfaces of the lower pad layer 3A and the upper pad layer 3B are not bonded together. Thus, these pad layers are made separable in response to external force applied from a side.

Figure 4A:
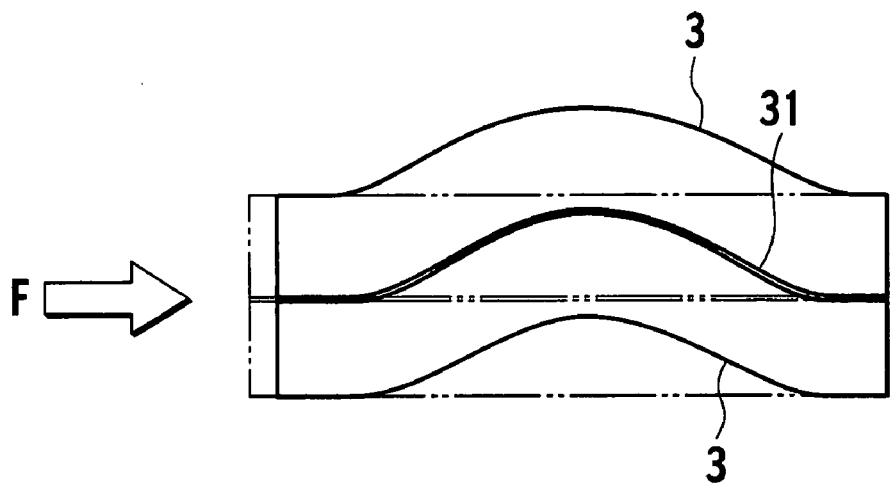
FIGS. 4A and 4B are schematic drawings for explaining motions of pad layers at the time when external force is applied from a side.

For example, as shown in FIG. 4A, if an upper pad layer 3 and a lower pad layer 3 are bonded together with an adhesive layer 31 made of an adhesive or the like, these pad layers 3 move integrally.

For this reason, if external force F is applied from a side in a parallel direction to the boundary surfaces of the respective pad layers 3, the bonded pad layers 3 are integrally deformed. As a result, it is difficult to effect such deformation, and large reactive force is generated as a reaction.

Specifically, when an elbow of a passenger reaches the armrest 1 due to load applied to a side portion of the car body, the external force F is applied to the pad layers 3 with the elbow. Here, the large reactive force also applies to the elbow.

Figure 4B:
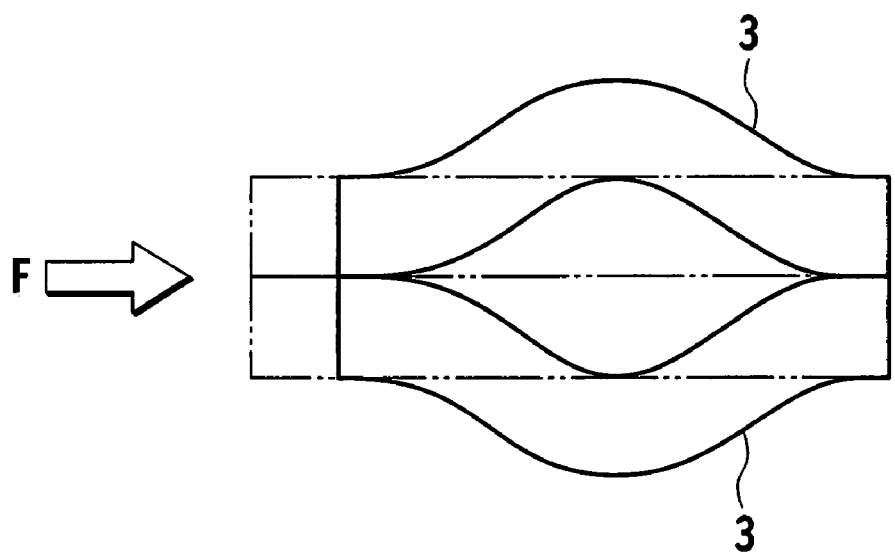

On the other hand, as shown in FIG. 4B, if the upper pad layer 3 is not bonded with the lower pad layer 3, the pad layers 3 are separated from each other, and independently move, in response to the external force F applied from a side. Accordingly, the magnitude of the reactive force generated as a reaction is limited.

Moreover, in this embodiment as well, the boundary surfaces of the respective lower pad layer 3A and the upper pad layer 3B of the armrest 1 are not bonded with each other. Thus, these pad layers exhibit similar motions to the motions described with reference to the schematic diagram shown in FIG. 4B in response to the external force F applied from a side. Here, the magnitude of the reactive force generated as a reaction is limited.

Although FIG. 4B schematically illustrates the state where the two pad layers 3 are detached from each other, the "separation" stated in this embodiment includes not only the case of detachment but also a case of independent motions (deformation) where the two pad layers 3 are sidably displaced from each other on the boundary thereof.

Meanwhile, in response to downward force applied at the time when the passenger places the elbow on the armrest 1, the upper pad layer 3B and the lower pad layer 3A move almost integrally. Thereby, it is possible to ensure stability by way of the thickness of the two pad layers 3A and 3B.

Specifically, if the armrest is formed by reducing the thickness of the pad layer, or by using only a flexible material to achieve the structure which is deformable or fragile against the external force F applied from a side, the armrest may bend, fail to achieve soft texture, be indented too much due to lack of resilience, when the passenger places his/her elbow thereon. On the other hand, in this embodiment, since multiple pad layers 3A and 3B can be disposed, it is made possible to easily adjust the stability, the texture, the reactive force and the like against the downward load by means of changing the thickness and hardness of each of the pad layers 3A and 3B.

Moreover, by covering the lower pad layer 3A with the upper pad layer 3B, the texture of the armrest 1 sensed by the passenger is mainly determined by the nature of the upper pad layer 3B. Hence, it is possible to avoid discomfort that the passenger may feel depending on which part of the surface he/she contacts.

In addition, it is also possible to reduce the weight of the armrest 1 by using a material having very low density for the lower pad layer 3A.

FIRST EXAMPLE

A first example of the above-described embodiment will be described below with reference to the accompanying drawing. In the following explanation, constituents identical or equivalent to those described in the embodiment will be designated by the identical reference numerals.

In the above-described embodiment, the core member 2 is provided with the holes 2a and the steps 2e to cause the core member 2 to be easily deformed or be fragile against the external force F applied from a side. In this first example, a core member 12 having a different structure will be described.

Figure 5:
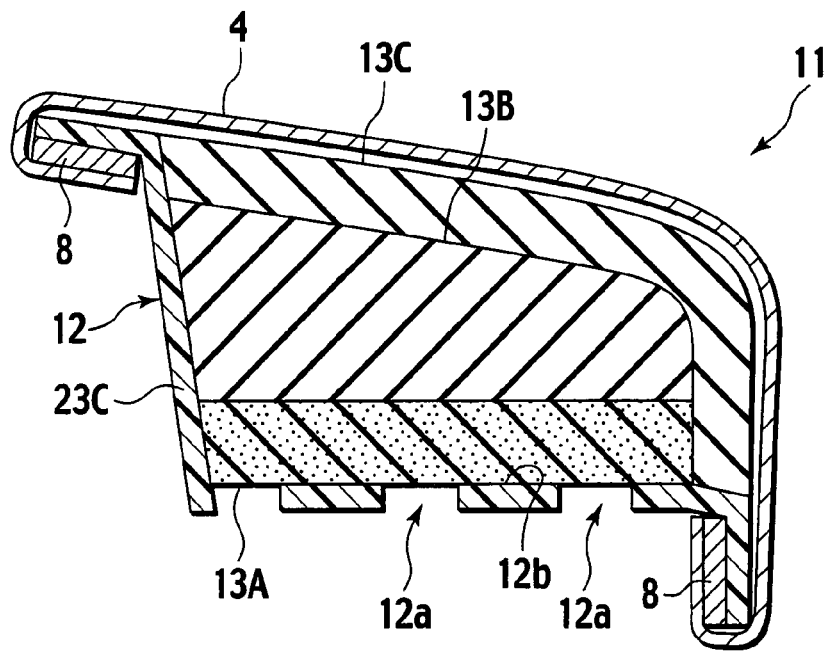
FIG. 5 is a cross-sectional view showing a configuration of an armrest according to a first example.
Figure 6:
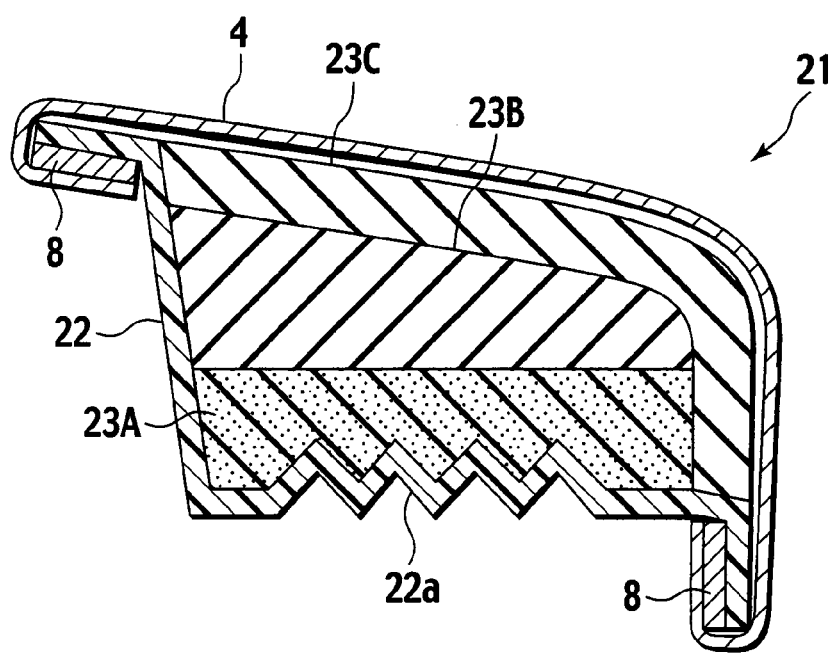
FIG. 6 is a cross-sectional view showing a configuration of an armrest according to a second example.

In this first example, an armrest 11 is formed by use of the core member 12 as shown in FIG. 5, in which a side wall 12c and a bottom face 12b collectively constitute a substantially L-shaped cross section, and more holes 12a than those of the aforementioned embodiment are provided on the flat bottom face 12.

Moreover, a lower pad layer 13A to be disposed on the bottom face 12b of this core member 12 is made of soft and flexible urethane foam so as to reduce resistance when the bottom face 12b is deformed.

Furthermore, a middle pad layer 13B is placed on an upper surface of the lower pad layer 13A. In addition, an upper pad layer 13C having an L-shaped cross section for covering an upper surface of the middle pad layer 13B as well as side faces of the middle pad layer 13B and the lower pad layer 13A on the cabin side, is placed on the middle pad layer 13B.

The middle pad layer 13B and the upper pad layer 13C may be molded with materials having desired hardness, such as flexible urethane foam or semi-rigid urethane foam.

Interface between the bottom face 12b of the core member 12 and the lower pad layer 13A, interface between the lower pad layer 13A and the middle pad layer 13B, and interface between the middle pad layer 13B and the upper pad layer 13C, are not bonded together with an adhesive or the like. Instead, these pad layers only overlap and abut on one another.

For this reason, the external force F applied to the armrest 11 from a side causes the boundary surfaces of the pad layers 13A, 13B, and 13C to move to be separated from one another. Such motions absorb energy, and prevent generation of large reactive force.

Moreover, by use of the core member 12 having the simple structure, it is possible to form the armrest 11 which can be largely deformed in response to the external force F applied from a side, and which ensures the stability against the vertical force. Thus, it is possible to reduce manufacturing costs for the armrest 11.

Other features and operations of this example are substantially identical to the above-described embodiment, and explanations thereof will be omitted.

SECOND EXAMPLE

A second example of the above-described embodiment will be described below with reference to the accompanying drawing. In the following explanation, constituents identical or equivalent to those described in the embodiment will be designated by the identical reference numerals.

In this second example, descriptions will be provided for an armrest 21 formed by use of a core member 22 having a different structure from those used in the embodiment and in the first example.

In the core member 22 of this second example, a bellows 22a formed into a bellows shape having a serrated cross section, is provided to a bottom face. Accordingly, when the external force F is applied thereto from a side, this bellows 22a shrinks, and thereby can be easily deformed in the car width direction.

A lower pad layer 23A disposed on the bellows 22a is molded with soft and flexible urethane foam. In this way, it is possible to deform a lower surface of the lower pad layer 23A so as to follow the shape of the bellows 22a. Hence, no irregularities or inclinations appear on an upper surface of the lower pad layer 23A. Accordingly, this enhances stability at the time of assembly.

In addition, by using a soft material for filling a surrounding portion of the bellows 22a, it is possible to reduce resistance at the time when the bellows 22a is deformed, and thereby to deform the bellows 22a easily.

A middle pad layer 23B is placed on an upper surface of the lower pad layer 23A. In addition, an upper pad layer 23C having an L-shaped cross section for covering an upper surface of the middle pad layer 23B, and side faces of the middle pad layer 23B and of the lower pad layer 23A on the cabin side, is placed on the middle pad layer 23B.

Here, these pad layers 23A, 23B, and 23C are not bonded together, and are formed separable from one another in response to the external force F applied from a side. Accordingly, when the external force F is applied to the arm rest 21 from a side with the elbow of the passenger, the bellows 22a shrinks accordingly, and sliding actions or separating actions occur among the pad layers 23A, 23B, and 23C. Since these actions absorb energy, it is possible to prevent large reactive force from being applied to the elbow of the passenger.

Other features and operations of this example are substantially identical to the embodiment or the first example described above, and explanations thereof will be omitted.

The preferred embodiment of the present invention has been described above with reference the accompanying drawings. It is to be noted, however, that the concrete configuration of the invention is not limited to these embodiment and examples. The present invention encompasses various design changes without departing from the scope of the invention.

For example, in the examples, descriptions have been provided for the cases of not bonding any of the boundary surfaces of the pad layers. However, the present invention is not limited to this configuration. The energy will be absorbed by separation of the pad layers on the boundary surfaces as long as at least parts of the boundary surfaces of the pad layers are not bonded with each other so as to be separable in response to the external force applied from a side. Hence, it is possible to reduce the reactive force as compared to the case where all of the pad layers integrally resist against the external force.

In the embodiment and the examples, the armrests 1, 11, and 12 which include two or three pad layers, have been described. However, the present invention is not limited to these configurations. It is possible to set the number and the materials of the pad layers as long as two or more pad layers are provided in the armrest.

Moreover, in the embodiment, the armrest 1 provided to the door trim has been described. However, the present invention is not limited to this configuration. The present invention is applicable to any type of interior trim for an automobile as long as the interior trim is designed to be disposed on a cabin side, and to attach an armrest thereto.

What is claimed is:

1. An interior trim for an automobile provided with an armrest projecting from a trim body which supports the armrest on a surface side of the trim body disposed on a cabin side of a car body, wherein
the armrest comprises a core member, and a plurality of pad layers stacked on the core member, and
at least an interface between the pad layers is not bonded and the pad layers abut on each other to allow each pad layer to be separable and independently moveable by external force applied from a side.

2. The interior trim for an automobile according to claim 1, wherein each of the pad layers is formed of a material having a hardness different from that of one another.

3. The interior trim for an automobile according to claim 1, wherein a pad layer contacting the core member is formed by use of a deformable material which accommodates irregularities of an upper surface of the core member.

4. The interior trim for an automobile according to claim 1, wherein the plurality of pad layers include an upper pad layer having a substantially L-shaped cross section for covering an upper surface and a side face of a lower pad layer on the cabin side.

5. The interior trim for an automobile according to claim 1, further comprising a bellows which is attached to the core member, and which can be shrunk in a car width direction.

6. An automobile, comprising:
the car body; and
a car door including the interior trim for an automobile according to claim 1.

7. An automobile, comprising:
the car body; and
a car door including the interior trim for an automobile according to claim 2.

8. An automobile, comprising:
the car body; and
a car door including the interior trim for an automobile according to claim 3.

9. An automobile, comprising:
the car body; and
a car door including the interior trim for an automobile according to claim 4.

10. An automobile, comprising:
the car body; and
a car door including the interior trim for an automobile according to claim 5.

11. The interior trim for an automobile according to claim 1, wherein the core member comprises a container portion that includes:
a plurality of steps and a plurality of holes arranged in a longitudinal direction of the car body with spaces interposed in between in a car width direction, wherein the holes are adapted to increase an amount of at least one of deformation and breakage when load in the car width direction is applied to the core member, the steps are adapted to increase energy absorption strokes when the external force applied from the side is applied to increase an amount of at least one of deformation and fragileness, and respective cross-sections of each pad layer are adapted to bow away from one another in response to the external force applied from the side.

12. The interior trim for an automobile according to claim 1, wherein respective cross-sections of each pad layer are adapted to bow away from one another in response to the external force applied from the side.

13. An automobile, comprising:
the car body; and
a car door including the interior trim for an automobile according to claim 11.

14. An automobile, comprising:
the car body; and
a car door including the interior trim for an automobile according to claim 12.

* * * * *